United States Patent [19]
Fukuzawa et al.

[11] Patent Number: 6,162,572
[45] Date of Patent: Dec. 19, 2000

[54] TONER FOR ELECTROPHOTOGRAPHY

[75] Inventors: Junichi Fukuzawa, Yokohama; Takuya Hoga, Urawa; Toru Nakamura, Abiko; Toshimi Nishioka, Suita, all of Japan; Horst-Tore Land, Hofheim; Fredy Helmer-Metzmann, Essenheim, both of Germany

[73] Assignee: Hoechst Research & Technology Deutchland GmbH & Co. KG

[21] Appl. No.: 09/531,837

[22] Filed: Mar. 21, 2000

Related U.S. Application Data

[62] Division of application No. 09/000,373, filed as application No. PCT/JP96/02134, Jul. 29, 1996, Pat. No. 6,052,940.

[30] Foreign Application Priority Data

Aug. 2, 1995 [JP] Japan .................................. H7/216752

[51] Int. Cl.[7] .................................................. G03G 9/097
[52] U.S. Cl. .......................................... 430/110; 730/111
[58] Field of Search ...................................... 430/110, 111

[56] References Cited

U.S. PATENT DOCUMENTS

| | | | |
|---|---|---|---|
| 5,023,388 | 6/1991 | Luker ......................................... | 585/9 |
| 5,650,254 | 7/1997 | Eguchi et al. ........................... | 430/101 |
| 5,658,999 | 8/1997 | Inoue et al. .............................. | 430/110 |
| 5,707,772 | 1/1998 | Akimoto et al. ........................ | 430/110 |

FOREIGN PATENT DOCUMENTS

| | | |
|---|---|---|
| 0563834 | 10/1993 | European Pat. Off. . |
| 0587540 | 3/1994 | European Pat. Off. . |

OTHER PUBLICATIONS

Database WPI, Section Ch. Week 9438, Derwent Publication Ltd., London, GB; XP002075385.

*Primary Examiner*—John Goodrow
*Attorney, Agent, or Firm*—Frommer Lawrence & Haug

[57] ABSTRACT

This invention relates to a toner for electrophotography which develops an electrostatically charged image, the toner at least containing a coloring agent, a binder resin, a charge control agent, and a functioning agent, wherein low molecular weight polyolefin wax obtained by a metallocene type polymerization catalyst is contained as the function imparting agent. The toner of the invention is excellent in fixability, and has offset preventing properties, heat response characteristic, anti-spent toner properties, and storage stability, which can thus obtain a sharp, high quality image.

12 Claims, No Drawings

TONER FOR ELECTROPHOTOGRAPHY

This appln is a div of Ser. No. 09/000,373 filed May 20, 1998, U.S. Pat. No. 6,052,940, which is a 371 of PCT/JP96/02134 filed Jul. 29, 1996.

TECHNICAL FIELD

The present invention relates to a toner for electrophotography. More specifically, this invention relates to a toner in a one-component or two-component dry developer, which toner exhibits excellent fixability, offset preventing properties and heat response characteristic at the time of fixing.

BACKGROUND ART

In recent years, electrophotographic copiers and printers have gained popularity because of widespread office automation. With this background, there has been growing demand for electric power saving and downsizing of the machines in addition to high speed copying.

General formulations for toners in electrophotographic copiers and printers are shown in Table 1. One of the main factors for improving the fixability and offset preventing properties is a functioning agent, a component of the toner. Wax for use during the production of the toner, in particular, affects a binder resin, a principal constituent of the toner, and proves useful for improving the fixability, offset preventing properties and heat response characteristic.

That is, an electrophotographic copier or printer feeds a toner to a latent image on a latent image carrier to obtain a visible image, then transfers the resulting toner image to a plain paper or an OHP film, and fixes the transferred image. Currently, wide varieties of waxes are used in this field. Among them, low molecular weight polyethylene waxes and low molecular weight polypropylene waxes are in wide use. The current methods of producing polyethylene waxes and polypropylene waxes mainly employ Ziegler-Natta catalysts, and are classified into the polymerization process and the depolymerization process. However, waxes produced by these methods are defective in that the ratio of the weight average molecular weight Mw to the number average molecular weight Mn, the Mw/Mn ratio, exceeds 2, resulting in poor heat response characteristic. This adversely affects the fixability and offset preventing properties. Consequently, toners using such waxes cannot fully meet the social demand for saving in electric power and downsizing of the machines in addition to high speed copying.

TABLE 1

| | Binder resin | Coloring agent | Charge control agent | Functioning agent | Magnetic powder | Electrolytic Solution | Other |
|---|---|---|---|---|---|---|---|
| Two component system | 50–100 | 0–20 | 0–10 | 0–20 | — | — | — |
| One component system | 0–100 | 0–20 | 0–10 | 0–20 | 0–60 | | |

(Unit: wt. %)

The present invention has been accomplished in the light of the aforementioned problems. The object of this invention is to provide a toner in a one-component developer and a two-component developer which toner leads to produce a higher grade copy image in an electrophotographic copier or printer, that is, the toner excellent in fixability, offset preventing properties and heat response characteristic.

DISCLOSURE OF THE INVENTION

The present invention provides a toner for electrophotography which develops an electrostatically charged image, the toner at least containing a coloring agent, a binder resin, a charge control agent, and a functioning agent, wherein low molecular weight polyolefin wax obtained by using a metallocene type polymerization catalyst is contained as the functioning agent.

As a preferred embodiment, the invention also provides the toner for electrophotography in which the low molecular weight polyolefin wax has a number average molecular weight, Mn, of 1,000 to 15,000 and a weight average molecular weight, Mw, of 1,000 to 30,000 as measured by the GPC method, and the Mw/Mn ratio is within the range from 1 to 2. As another preferred embodiment, the invention also provides the toner for electrophotography in which the low molecular weight polyolefin wax comprises a polyolefin selected from homopolymers of alpha olefins, copolymers of alpha olefins with other alpha olefins, and copolymers of alpha olefins with cycloolefins.

To attain the aforementioned object, we, the inventors, have noted that the Mw/Mn ratio of polyolefins polymerized commercially using conventional catalysts exceeds 2, while the Mw/Mn ratio of polyolefins polymerized using metallocene catalysts can be controlled to be within the range from 1 to 2. Thus, we have considered that the use of such polyolefins as functioning agents is one of the way improving the fixability, offset preventing properties and heat response characteristic of toner. The present invention has been accomplished on the basis of such findings. A toner using wax satisfying these characteristics as a functioning agent can affect the binder resin, and serve as a toner for producing a high grade copy image, that is, the toner which is excellent in fixing strength, offset preventing properties and heat response characteristic, and which fulfills social demand, i.e., saving in electric power, high speed operation, and downsizing of an electrophotographic copier or printer. The toner of the present invention is used as a toner for electrophotography of a heat fixing type, such as a heat roller fixing type. The toner of the roller fixing type may concurrently have pressure fixing properties. The toner of the present invention is used in electrophotographic copiers or printers employing inorganic photosensitive materials or organic photosensitive materials such as organic photoconductors (OPC).

Details of the present invention will be offered below.

The toner for electrophotography of the present invention is characterized in that the functioning agent is low molecular weight polyolefin wax obtained by using a metallocene type polymerization catalyst.

The metallocene type polymerization catalyst as used herein refers to a catalyst system comprising (A) a molecule of a sandwich structure and (B) aluminoxane, the molecule (A) comprising two cyclopentadienyl rings or substituted cyclopentadienyl rings covalently bonded to a transition metal selected from the Groups IVb, Vb and VIb of the periodic table, such as titanium, zirconium, hafnium, vanadium or chromium.

Examples of the low molecular weight polyolefin wax obtained by using the metallocene type polymerization catalyst are homopolymers of alpha olefins such as ethylene and propylene, copolymers of alpha olefins with other alpha olefins, and copolymers of alpha olefins with cyclic olefin compounds (e.g. cyclohexene and norbornene).

Preferably, the low molecular weight polyolefin wax has a number average molecular weight, Mn, of 1,000 to 15,000 and a weight average molecular weight, Mw, of 1,000 to 30,000 as measured by the GPC method, and its Mw/Mn ratio is within the range from 1 to 2.

The low molecular weight polyolefin wax obtained using the metallocene type polymerization catalyst is monodisperse as indicated by its very low Mw/Mn ratio, and involves very small heat of fusion. Thus, the use of this wax is estimated to easily obtain a toner with excellent heat response characteristic. This affects the fixing properties of the toner during high speed operation, and the offset-free temperature range of the toner, thereby contributing to upgrading a copy image and saving electric power.

The toner of the present invention can be obtained by adding the foregoing functioning agent to a binder resin, a coloring agent and a charge control agent, and if desired, further addition of other additives, and processing by known methods such as kneading, grinding and sifting are possibly made. If desired, a flowing agent may be further added.

As the binder resin there may be used any known ones. Examples include homopolymers of styrene and its substituted compounds, such as polystyrene, poly p-chlorostyrene and polyvinyltoluene; styrene copolymers, such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl a-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyesters; polyurethanes; polyamides; epoxy resins; polyvinyl butyral; polyacrylates; rosin; modified rosin; terpene resin; phenolic resins; aliphatic or alicyclic hydrocarbon resins; aromatic petroleum resins; chlorinated paraffin; and paraffin wax. These compounds may be used alone or in combination.

The coloring agent may be a known one, such as carbon black, iron oxide pigment, phthalocyanine blue, phthalocyanine green, rhodamine 6G lake, or Watchung red strontium.

Examples of the charge control agent are known ones such as Nigrosine dyes, fatty acid modified Nigrosine dyes, metallized Nigrosine dyes, metallized fatty acid modified Nigrosine dyes, and chromium complexes of 3,5-di-tert-butylsalicylic acid.

To the toner of the present invention, there may be further added a flowing agent such as colloidal silica, aluminum oxide or titanium oxide, and a lubricant comprising a fatty acid metal salt such as barium stearate, calcium stearate or barium laurate.

The toner of the invention may be used as a toner for one component developers or two component developers. Moreover, the toner of the invention may be used as a one component magnetic toner by incorporating a magnetic powder, or may be used as a full color toner.

The present invention will be described in more detail by reference to Examples and Comparative Examples.

Toner preparation method

Eight % by weight of carbon black (MA-7, Mitsubishi Kagaku), 2% by weight of a charge control agent (Copy Blue RP, Hoechst), 4% by weight of aerosol silica (HDK-H2000, Wacker Chemie), 84% by weight of a binder resin (MC100, Nippon Carbide), and 2% by weight of control wax as a function imparting agent were mixed, and melt kneaded at 130° C. by a two roll mill. Then, the mixture was cooled down to solidification, and crushed, followed by powderizing the particles using a jet mill. The resulting fine particles were sifted to select particles with an average particle diameter of about 10 micrometers, thereby preparing a toner.

EXAMPLE 1

In the above-described toner preparation method, T-516 (a product of Hoechst, a low molecular weight polyolefin resin produced by a metallocene type polymerization catalyst) was used as wax to prepare a toner of Example 1.

EXAMPLE 2

In the above-described toner preparation method, T-668 (a product of Hoechst, a low molecular weight polyolefin resin produced by a metallocene type polymerization catalyst) was used as wax to prepare a toner of Example 2.

EXAMPLE 3

In the above-described toner preparation method, T-692 (a product of Hoechst, a low molecular weight polyolefin resin produced by a metallocene type polymerization catalyst) was used as wax to prepare a toner of Example 3.

EXAMPLE 4

In the above-described toner preparation method, T-246 (a product of Hoechst, a low molecular weight polyolefin resin produced by a metallocene type polymerization catalyst) was used as wax to prepare a toner of Example 4.

COMPARATIVE EXAMPLE 1

In the above-described toner preparation method, polyethylene wax obtained by polymerization using a Ziegler-Natta catalyst (the wax called Hoechst Wax PE190, a product of Hoechst) was used as wax to prepare a toner of Comparative Example 1.

COMPARATIVE EXAMPLE 2

In the above-described toner preparation method, polyethylene wax obtained by polymerization using a Ziegler-Natta catalyst (Hoechst Wax PE130, a product of Hoechst) was used as wax to prepare a toner of Comparative Example 2.

COMPARATIVE EXAMPLE 3

In the above-described toner preparation method, depolymerization type polypropylene wax (Viscol 550P, Sanyo Kasei Kogyo) was used as wax to prepare a toner of Comparative Example 3.

COMPARATIVE EXAMPLE 4

In the above-described toner preparation method, depolymerization type polypropylene wax (Viscol 660P, Sanyo Kasei Kogyo) was used as wax to prepare a toner of Comparative Example 4.

Table 2 shows the fundamental properties of the polyolefin resins polymerized by the metallocene catalyst method that were used in the present invention.

TABLE 2

| Product name | Wt. average molecular weight (MW) (g/mol) | No. average molecular weight (Mn) (g/mol) | Degree of dispersion Mw/Mn | Glass transition temp. (degrees C.) | Hue |
|---|---|---|---|---|---|
| T516 | 21,000 | 11,500 | 1.8 | 82 | Colorless and transparent |
| T668 | 8,500 | 4,300 | 1.9 | 86 | Colorless and transparent |
| T692 | 9,500 | 4,700 | 2.0 | 75 | Colorless and transparent |
| T246 | 4,500 | 2,500 | 1.8 | −15 | Milky white |

The toners prepared in the Examples and Comparative Examples were each fed to a commercially available electrophotographic copier (NP9800, Canon Inc., for high speed operation; PC100, Canon Inc., for low speed operation), and subjected to performance tests. The results are shown in Table 3. Table 3 shows that the toners of the Examples are superior to the toners of the Comparative Examples in all of the fixability, the offset preventing properties, and anti-spent toner properties. In terms of storage stability essential for the performance of toner, the toners of the Examples were free from problems, such as blocking, under the predetermined conditions, and gave satisfactory results.

TABLE 3

| | Fixability | | Offset preventing effect | | Storage stability | Anti-spent toner properties |
|---|---|---|---|---|---|---|
| | High speed | Low speed | Low temp. region | High temp. region | | |
| Ex. 1 | ○ | Δ | Δ | ○ | ○ | ○ |
| Ex. 2 | ○ | ○ | ○ | ○ | ○ | Δ |
| Ex. 3 | ○ | ○ | ○ | ○ | ○ | Δ |
| Ex. 4 | ○ | Δ | Δ | ○ | ○ | Δ |
| Comp. Ex. 1 | Δ | X | X | Δ | Δ | X |
| Comp. Ex. 2 | Δ | X | Δ | X | Δ | X |
| Comp. Ex. 3 | Δ | X | X | Δ | Δ | X |
| Comp. Ex. 4 | Δ | X | X | Δ | Δ | X |

Evaluation methods and evaluation criteria

1) Fixability (in high speed operation and low speed operation)

The toners prepared with the respective formulations were each used for copying onto recycled papers at a copying rate of 100 copies/min at a fixing temperature of 170 to 200° C. for high speed operation, or at a copying rate of 10 copies/min at a fixing temperature of 120 to 140° C. for low speed operation, with the fixing temperature for each copying cycle being raised by 10° C. The resulting copy samples were rubbed 10 times with an eraser by using an abrasion tester of Southerland. The load during the test was 40 g/cm$^2$. The tested samples were measured for the printing density using a Macbeth reflection densitometer. The symbol X was assigned when even one of the measured values at the respective temperatures was 65% or less. The symbol Δ was assigned when the measured values at the respective temperatures were 66 to 75%. The symbol ○ was assigned when the measured values at the respective temperatures were 76% or more.

2) Offset preventing effect

The toners prepared with the respective formulations were each subjected to actual copying tests at a copying rate of 100 copies/min at a fixing temperature of 140 to 240° C. with the fixing temperature for each copying cycle being raised by 5° C. The gray scale chart was utilized for the tests. A smudge of the fixing roll during the test was evaluated visually. Simultaneously, the resulting copied samples were examined by means of a Macbeth reflection densitometer. The samples were evaluated as offset-free when they were free from smudges on the fixing roll and in the non-image areas of copying papers (recycled papers) at the respective temperatures. The symbol ○ was assigned when the low temperature region of the offset-free temperatures (roll temperatures) was lower than 140° C.; Δ when this low temperature region was 140 to 160° C.; and X when this low temperature region was higher than 160° C. The symbol ○ was assigned when the high temperature region of the offset-free temperatures (roll temperatures) was higher than 230° C.; Δ when this high temperature region was 200 to 230° C.; and X when this high temperature region was lower than 200° C.

3) Storage stability

The toners prepared with the respective formulations were each stored for 8 hours under the conditions 60° C. and 50% RH. Then, the stored toner was sifted through a 100-mesh, whereafter the amount of the toner remaining on the mesh was divided by the amount of the sample used, and expressed as a percentage (the result to be hereinafter called mesh residue). When the toner particles agglomerate during storage, this value increases. The main cause of the agglomeration is low melting substances with a melting point of 50° C. or lower that are contained in the toner composition. The toner with a mesh residue of less than 0.5% was evaluated as ○, the toner with a mesh residue of 0.5 to 1.0% was evaluated as Δ, and the toner with a mesh residue of more than 1.0% was evaluated as X.

4) Anti-spent toner properties

The toners prepared with the respective formulations were each used for copying. The resulting copy image in the initial stage and the copy image after copying of 50,000 papers were checked against sample images of Data Quest. The ratio of the reflection density of each copy image to that of the reflection density of the sample image, on the gray scale, was determined by means of a Macbeth reflection densitometer. This ratio was obtained for both of the image obtained in the initial stage and the image after 50,000 copies. When both ratios differed by 35% or more, X was assigned. For a difference of 34 to 10%, Δ was assigned, and for a difference of 9% or less, ○ was assigned.

The toner for electrophotography of the present invention contains a functioning agent which is low molecular weight polyolefin wax obtained by using a metallocene polymerization catalyst. Thus, this toner has improvements in fixability, offset preventing properties, anti-spent toner properties, and storage stability. Hence, it can contribute to saving in electricity, downsizing and high speed operation of electrophotographic copiers or printers.

What is claimed is:

1. A toner for electrophotography which develops an electrostatically charged image, said toner at least containing a coloring agent, a binder resin, a charge control agent, and a functioning agent, wherein low molecular weight polyolefin wax obtained by using a metallocene type polymerization catalyst is contained as said functioning agent.

2. The toner for electrophotography of claim 1, wherein said low molecular weight polyolefin wax has a number average molecular weight, Mn, of 1,000 to 15,000 and a weight average molecular weight, Mw, of 1,000 to 30,000 as measured by the GPC method, and the Mw/Mn ratio is within the range from 1 to 2.

3. The toner for electrophotography of claim 1 or 2, wherein said low molecular weight polyolefin wax comprises a polyolefin selected from homopolymers of alpha olefins, copolymers of alpha olefins with other alpha olefins, and copolymers of alpha olefins with cycloolefins.

4. A toner for electrophotography which develops an electrostatically charged image, the toner comprising a coloring agent, a binder resin, a charge control agent, and a functioning agent, wherein the binder resin is a resin selected from the group consisting of styrene homo polymer, a styrene copolymer, a polymethyl methacrylate, polybutyl methacrylate, polyvinyl chloride, polyvinylacetate, polyester, polyurethane, polyamide, epoxy resin, polyacrylate aliphatic or alicyclic hydrocarbon resin, and the functioning agent is a low molecular weight monodisperse polyolefin wax obtained by using a metallocene type polymerization catalyst which has an average molecular weight, Mn, of 1,000 to 15,000 and a weight average molecular weight, Mw, of 1,000 to 30,000 as measured by a GPC method, and the Mw/Mn ration is within the range from 1 to 2.

5. A toner for electrophotography which develops an electrostatically charged image, the toner comprising a coloring agent a binder resin, a charge control agent, and a functioning agent which is a low molecular weight monodisperse polyolefin wax obtained by using a metallocene type polymerization catalyst which has an average molecular weight, Mn, of 1,000 to 15,000 and a weight average molecular weight, Mw, of 1,000 to 30,000 as measured by a GPC method, and the Mw/Mn ratio is within the range from 1 to 2, wherein the binder resin is a resin selected from the group consisting of styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl a-chloromethacrylate copolymer, styrene-acrylonitrile copolymer, styrene-vinyl methyl ether copolymers, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, styrene-maleic acid ester copolymer.

6. A toner for electrophotography as claimed in claim 4, wherein the charge control agent is selected from the group consisting of Nigrosine dyes, fatty acid modified Nigrosine dyes, metallized Nigrosine dyes, metallized fatty acid modified Nigrosine dyes, and chromium complexes of 3,5-di-tert-butylsalicylic acid.

7. A toner for electrophotography as claimed in claim 5, wherein the charge control agent is selected from the group consisting of Nigrosine dyes, fatty acid modified Nigrosine dyes, metallized Nigrosine dyes, metallized fatty acid modified Nigrosine dyes, and chromium complexes of 3,5-di-tert-butylsalicylic acid.

8. A toner for electrophotography as claimed in claim 4, further comprising a flowing agent selected from the group consisting of colloidal silica, aluminum oxide, titanium dioxide, and a lubricant comprising a fatty acid metal salt such as barium stearate, calcium stearate or barium laurate.

9. A toner for electrophotography as claimed in claim 5, further comprising a flowing agent selected from the group consisting of colloidal silica, aluminum oxide, titanium oxide, and a lubricant comprising a fatty acid metal salt such as barium stearate, calcium stearate or barium laurate.

10. A process for making a toner comprising the steps of:
   (a) adding a functioning agent to a binder resin, a coloring agent and a charge control agent, and
   (b) processing the coloring agent, the binder resin, the charge control agent and the functioning agent by kneading, grinding, or sifting,
wherein the functioning agent is a polyolefin wax having a number average molecular weight, Mn, of 1,000 to 15,000 and a weight average molecular weight, Mw, of 1,000 to 30,000 as measured by a GPC method, and the Mw/Mn ration is within the range from 1 to 2.

11. A method of using a toner as claimed in claim 4 in a one component or two component dry developer.

12. The process for making a toner as claimed in claim 10 further comprising the step of optionally adding a flowing agent.

* * * * *